Feb. 10, 1942. G. H. GARRETT ET AL 2,272,698
SHEET METAL PIPE MACHINE
Filed March 1, 1940 5 Sheets-Sheet 5
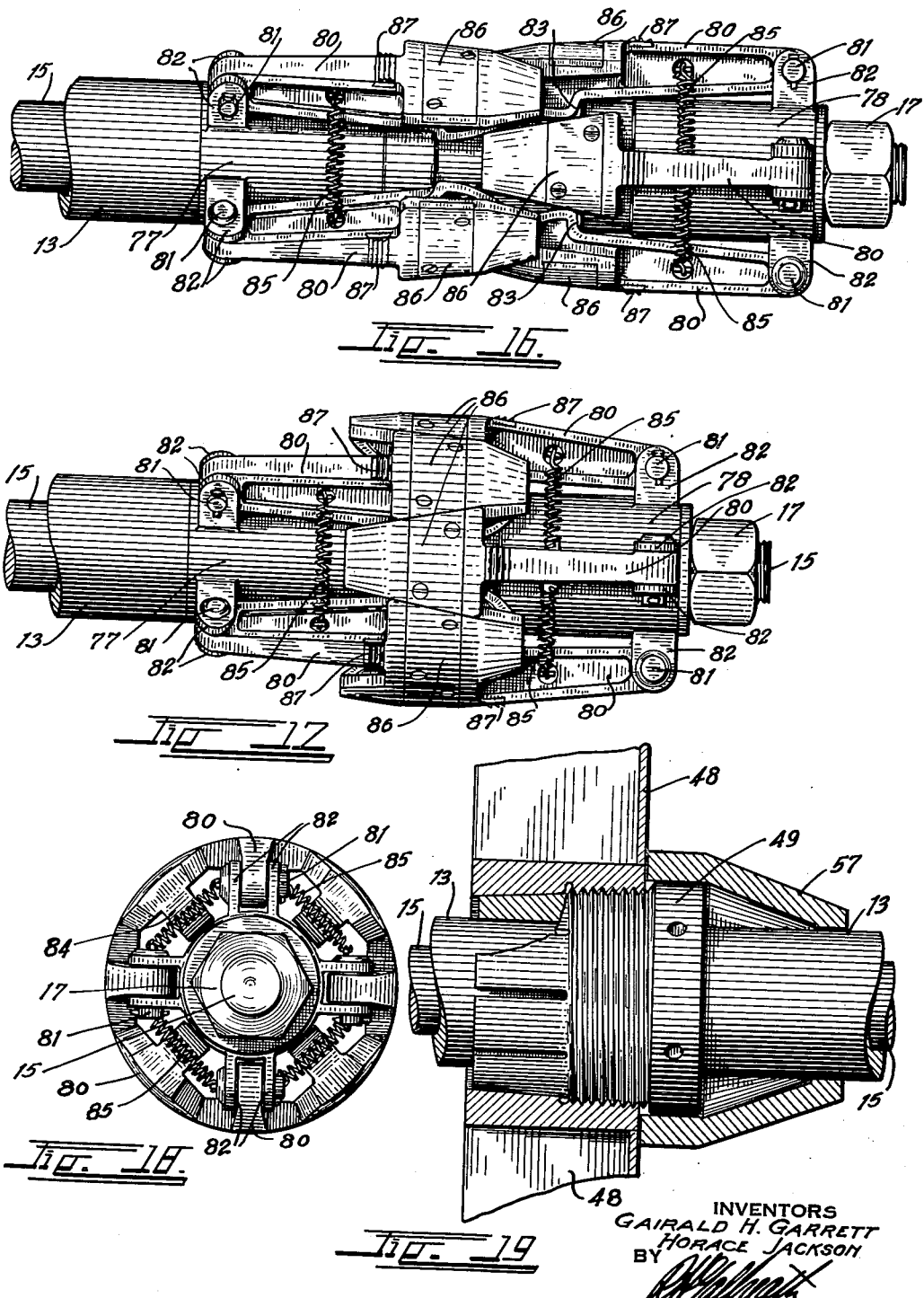

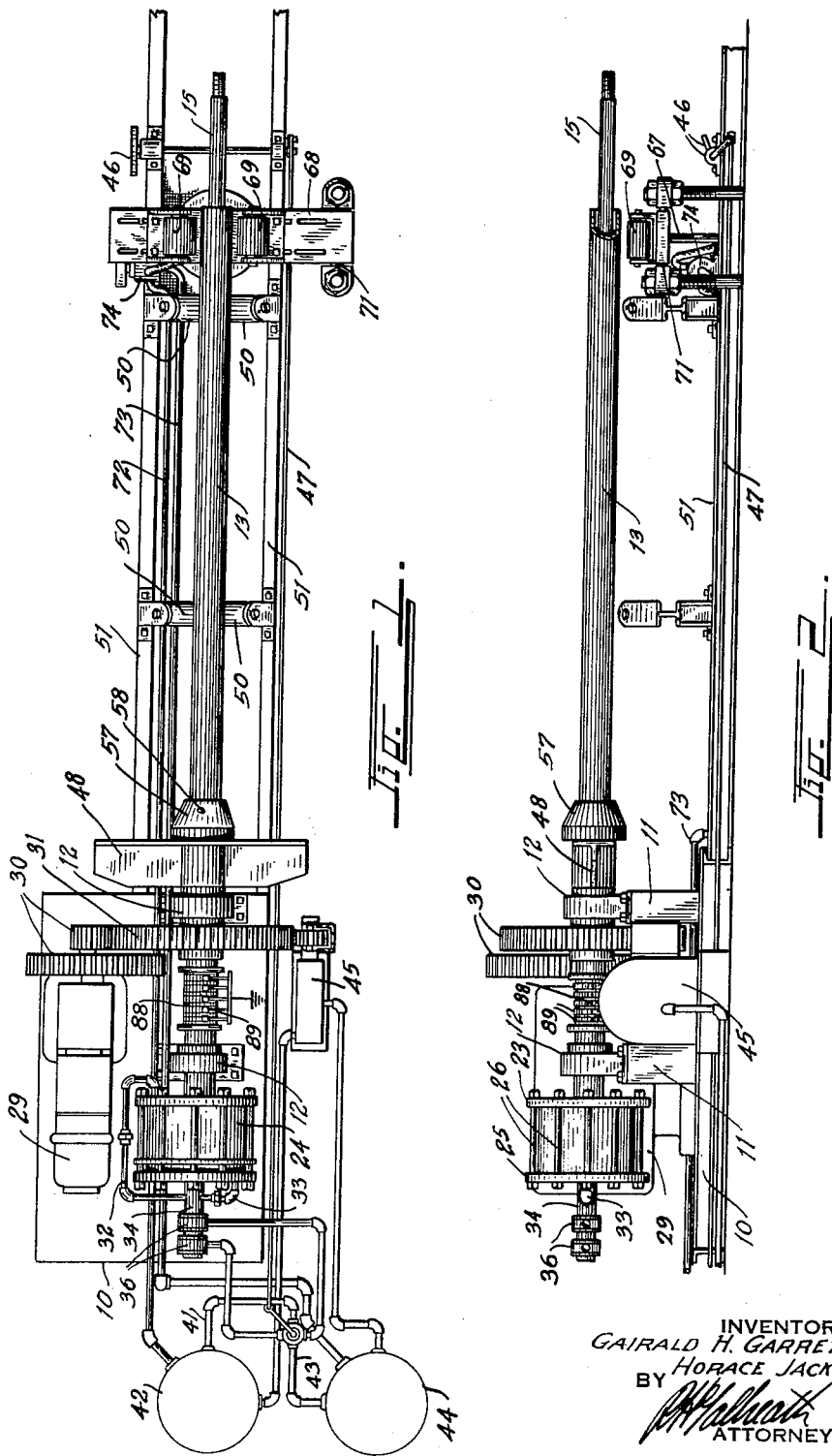

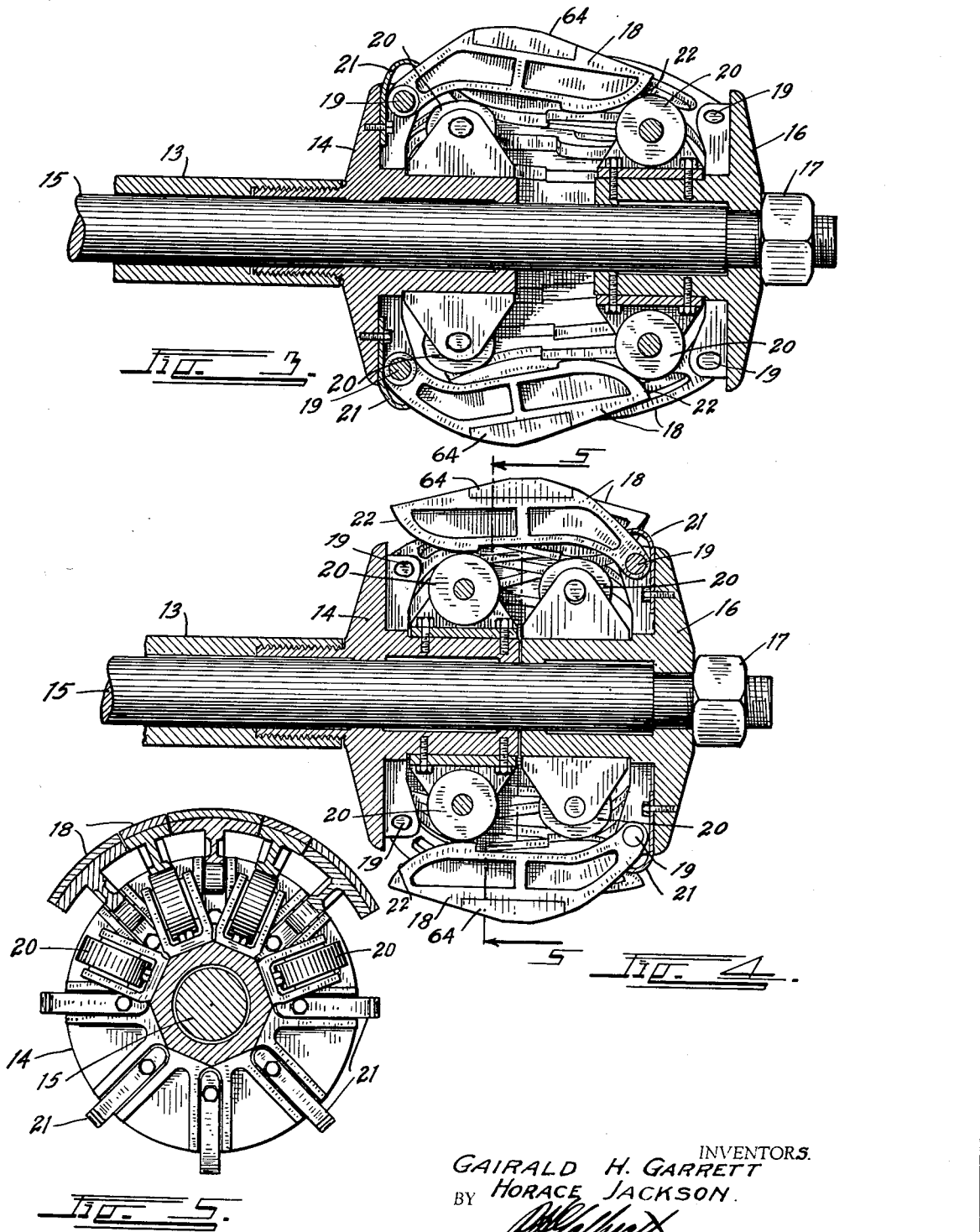

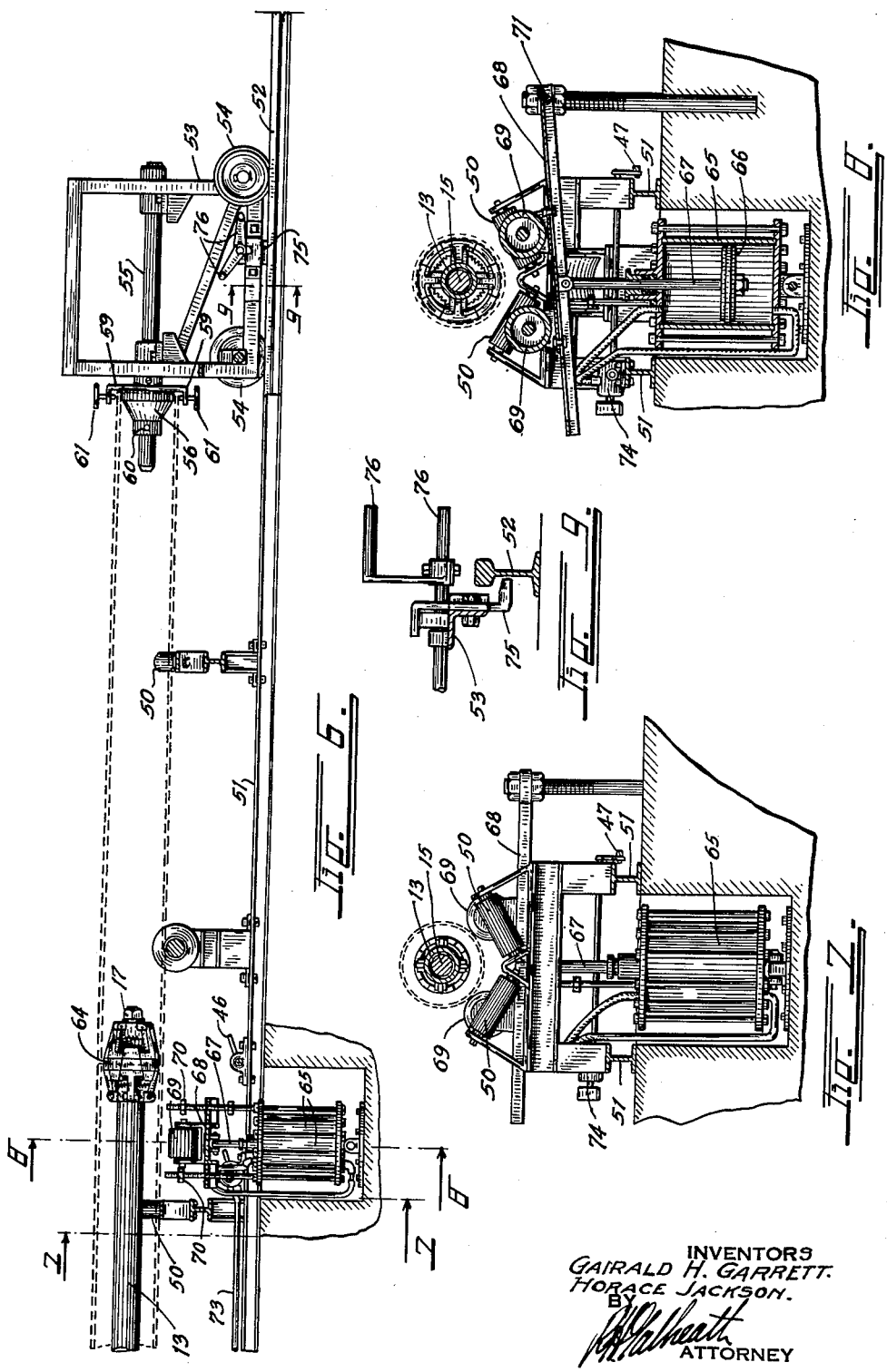

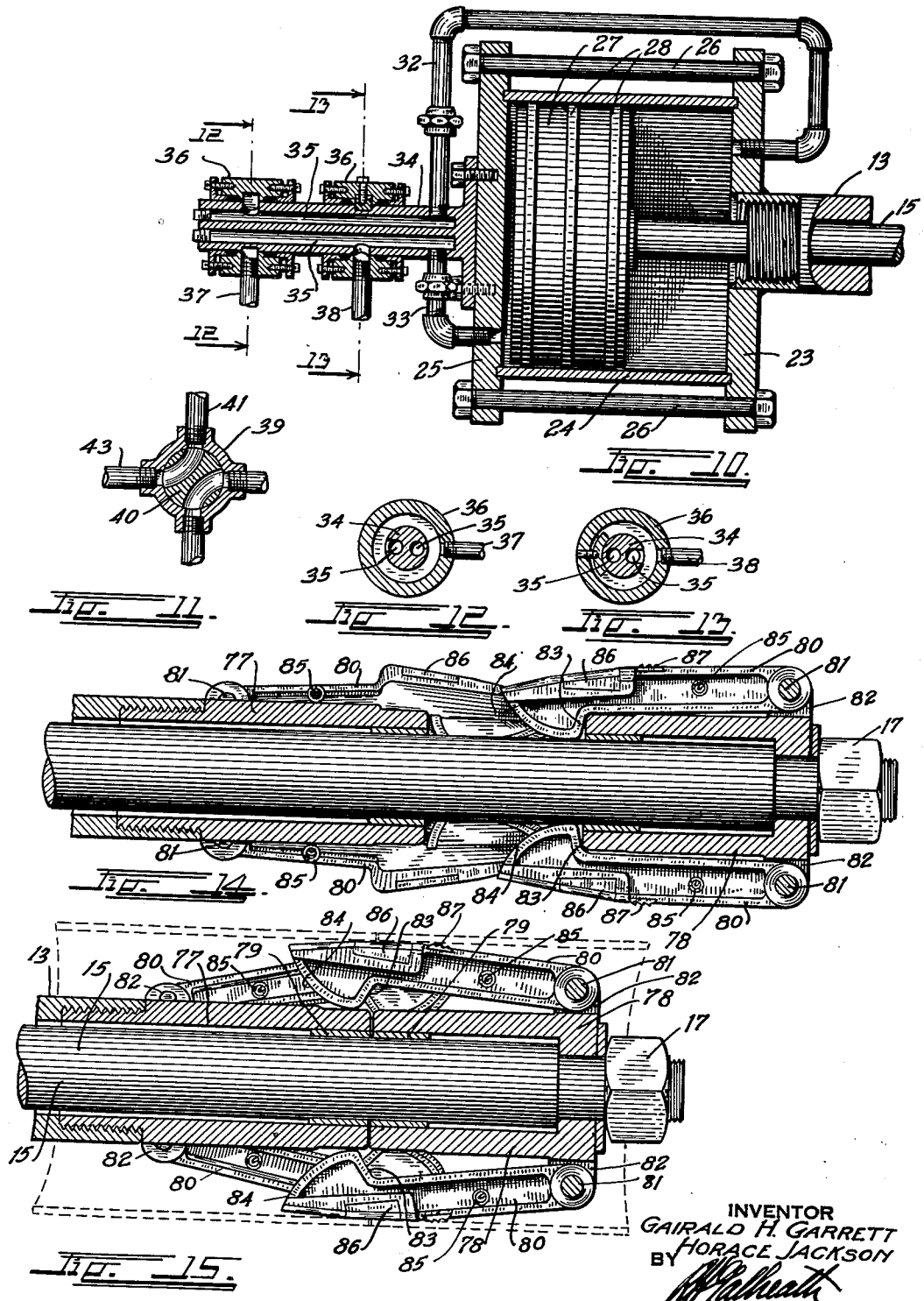

Patented Feb. 10, 1942

2,272,698

UNITED STATES PATENT OFFICE 2,272,698

SHEET METAL PIPE MACHINE

Gairald H. Garrett and Horace Jackson, Denver, Colo., assignors to Thompson Mfg. Co., Denver, Colo.

Application March 1, 1940, Serial No. 321,672

13 Claims. (Cl. 113—103)

This invention relates to a welding mandrel and machine for joining sections of sheet metal pipe.

In the manufacture of sheet metal pipe, plates are rolled and joined along a longitudinal seam to form pipe sections equal in length to the length of the original plate. These sections are then abutted and welded with a peripheral butt weld to form continuous pipe sections of any desired length. It is exceedingly difficult to bring the abutting edges of two sections into perfect alignment and maintain this alignment while completing the peripheral weld.

At present, it is customary to bring the pipe sections together at one side and "tack" weld it at this point and then to rotate the pipe and "tack" it at other points around the periphery. The two "tacked" sections are then completely welded by a continuous peripheral weld. This process is time consuming and if the sections have become distorted, through mishandling or from the heat at the "tack" welds, it is difficult and often impossible to bring the interior pipe surfaces to perfect alignment.

The principal object of this invention is to provide a machine which will uniformly expand within the pipe sections at the abutting extremities thereof to provide a continuous, circular, heat absorbing mandrel which will maintain the two sections in perfect alignment and which will mold the weld metal into perfect alignment with the internal surface of the pipe.

Another object of the invention is to provide a uniformly expanding joint mandrel with means for rotation so that the expanded, aligned joint can be rotated at uniform speed beneath the welding head of an electric welder to form a continuous uniform joint around the pipe.

Other objects of the invention are to provide a machine of this type which can be easily operated and controlled by the welder; which can be used upon a variety of pipe section lengths and diameters; and which will have sufficient power to expand flattened or distorted pipe sections of relatively heavy gauge to a perfect circle.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a plan view of the improved pipe welding machine with the expanding mandrel removed.

Fig. 2 is a side elevation thereof.

Fig. 3 is an enlarged section through one form of expanding mandrel, illustrating it in the contracted position.

Fig. 4 is a similar section illustrating the mandrel of Fig. 3 in the expanded position.

Fig. 5 is a cross section through the mandrel taken on the line 5—5, Fig. 4.

Fig. 6 is a side elevation of the mandrel extremity of the machine illustrating the supporting truck for the overhanging pipe section.

Fig. 7 is a vertical section taken in the line 7—7, Fig. 6, illustrating the centering jack for supporting the inner pipe section on the mandrel.

Fig. 8 is a similar section through the centering jack cylinder taken on the line 8—8, Fig. 6.

Fig. 9 is an enlarged detail view of the rail clamp for the supporting truck.

Fig. 10 is an enlarged detail section through the mandrel-operating cylinder of the machine.

Fig. 11 is a detail section through the control valve for controlling the operating cylinder.

Figs. 12 and 13 are detail sections through the supply connections to the operating cylinder taken on the lines 12—12 and 13—13, respectively, Fig. 10.

Figs. 14 and 15 are detail sections through a type of expanding mandrel, for use more particularly on light gauge, small diameter pipe, illustrating the mandrel in the contracted and expanded positions, respectively.

Figs. 16 and 17 are side views of the mandrel of Figs. 12 and 13 illustrating it in the contracted and expanded positions, respectively.

Fig. 18 is an end view of the mandrel of Fig. 17.

Fig. 19 is an enlarged detail sectional view illustrating the construction of the centering cone, cross arm, and cross arm wedge nut as used in the invention.

The improved pipe welding machine is supported upon any suitable base frame 10 from which two bearing pedestals 11 arise. The bearing pedestals support ball bearings 12 in which a tubular shaft 13 is journalled. The tubular shaft extends forward from its bearings a sufficient distance to extend throughout the length of the longest expected pipe section. On the outer extremity of the tubular shaft a fixed mandrel spool 14 is secured.

A plunger shaft 15 extends throughout the length of the tubular shaft 13 and projects beyond the extremity thereof terminating in a movable mandrel spool 16. The spool 16 can be removed from the plunger shaft by removing a clamping nut 17 and the fixed mandrel spool 14 can be unscrewed from the extremity of the tubular shaft 13.

Each of the spools 14 and 16 carries a series of sector-shaped blades 18, each of which is hinged upon a hinge pin 19 to one of the spools. Each alternate blade is secured to one spool and the intermediate blades are secured to the other spool. Each spool also carries a series of rollers 20, there being one roller between each pair of the blades which are hinged to that spool so that each roller will be positioned under the free extremity of one of the blades. The blades are held against these rollers by means of suitable leaf springs 21. The inner surface of the extremity of each blade is rounded, as indicated at 22, where it contacts the roller. Each blade carries an inset copper block 64 at the point where it contacts the inner surface of the pipe.

It can be readily seen that when two spools are separated, as in Fig. 3, the rollers will recede from the rounded surfaces 22 to allow the springs 21 to contract the blades inwardly to decrease the diameter of the complete assembly. When the two spools are brought together, as in Fig. 4, the rollers will ride under these rounded surfaces to expand all of the arms outwardly to increase the diameter of the complete assembly.

The inner extremity of the tubular shaft 13 is secured in a head 23 of an operating cylinder 24, the other extremity of which is closed by means of a cylinder head 25 clamped thereon by suitable clamp bolts 26. The plunger shaft 15 terminates within the cylinder 24 where it carries a piston 27 surrounded by suitable sealing rings 28.

It can be readily seen that if fluid under pressure is admitted to alternate ends of the cylinder 24, it will reciprocate the piston 27 therein and act to move the outer mandrel spool 16 inwardly and outwardly to contract and expand the mandrel.

The entire assembly of shafts, mandrel, operating cylinder, and piston is rotated from a suitable reduction geared motor 29 and reduction gears 30 through the medium of a drive gear 31 which is keyed on the tubular shaft 13.

The fluid to the forward and rearward extremities of the cylinder 24 is conducted through cylinder pipes 32 and 33, respectively. The cylinder pipes 32 and 33 lead from the cylinder to a trunnion member 34 which projects axially from the rear cylinder head 25. The trunnion member is provided with two bores or channels 35 one of which communicates with the pipe 32 and the other with the pipe 33. The trunnion member is surrounded by two, internally-channelled packing rings 36 which remain stationary while the trunnion member rotates. Packing glands 37 seal the rings to the trunnion member. One of the bores or channels 35 communicates with hollow channelled interior of one of the packing rings while the other channel 35 communicates with the other packing ring. Therefore, if fluid under pressure be fed to one ring it will flow to the front of the cylinder through the pipe 32 and if fed to the other ring will flow to the rear of the cylinder through the pipe 33. Fluid is fed to the first ring through a service pipe 37 and to the latter ring through a service pipe 38.

The two service pipes 37 and 38 lead to a four-way valve housing 39 in which is a four-way valve plug 40. A pressure line 41 leads to the valve housing 39 from a high pressure tank 42. A return line 43 leads from the valve to a sump tank 44. Fluid pressure for the pressure tank is supplied by means of a motor driven pump 45.

It can be readily seen that by rotating the valve plug 40 in one direction, one extremity of the operating cylinder is connected to the pressure tank and the other to the sump tank so that the piston moves inwardly and expands the mandrel. When turned in the opposite direction, the opposite takes place and the piston moves outwardly and contracts the mandrel. The valve is controlled from a foot pedal 46 at the welder's position which is connected by means of a connecting rod 47 with the valve plug 40.

A cross arm 48 is mounted on the tubular shaft 13 and can be fixed in any desired position thereon by means of a wedge nut 49. The cross arm acts as an abutment to stop the pipe sections at the proper point to bring their outer extremities to the middle of the expanding mandrel. For instance, if ten foot pipe sections are being welded together, the wedge nut 49 is loosened, the cross arm 48 is moved along the shaft 13 until the face of the cross arm is exactly ten feet from the middle of the expanding mandrel and the wedge nut 49 it then tightened to lock it in this position. Thereafter, each incoming pipe section will be stopped at the proper point for abutting its outer end to the end of the next incoming section over the expanding mandrel for welding.

The weight of the incoming pipe sections is supported upon guide rollers 50 mounted in V-shaped relation in guide frames 51. Any desired number of the guide frames may be used. It is preferred to employ at least two of them along the length of the shaft 13, and one beyond the extremity thereof. The guide frames are supported from a pair of rails 52 extending parallel to the shaft 13 and beyond the extremity of the latter.

The outer extremity of the second pipe length is supported from a wheeled truck 53 mounted on wheels 54 to run along the track rails 52. The truck can be locked at any desired point along the rails by means of rail clamps 75 operable from foot pedals 76. The truck carries a centering shaft 55 positioned in exact horizontal alignment with axis of the shaft bearings 12. The shaft 55 carries an interchangeable centering cone 56 and the tubular shaft 13 carries a similar centering cone 57. The outer diameter of the cones is the internal diameter of the finished pipe and they are interchangeable with other cones corresponding in diameter to the diameter of pipe being manufactured. The centering cone 57 is secured against the cross arm 48 by means of suitable set screw 58 and the cone 56 is secured against a clamp arm 59 on the centering shaft 55 by means of a set screw 60 or in any other desired manner. Clamp screws 61 in the clamp arm may be used to clamp the outer end of the secured pipe length to the cone 56.

The weight of the expanding mandrel and the weight of the two pipe lengths have a tendency to bend the relatively long cantilevered shafts 13 and 15 and if not compensated for this would result in a misalignment of the two pipe lengths. In the machine illustrated the pipe and the shafts are brought to exact horizontal alignment by means of a hydraulic centering jack as shown in Figs. 7 and 8.

The centering jack consists of a hydraulic cylinder 65 positioned below and between the track rails 52 beneath the shaft 13 adjacent the expanding mandrel thereon. The cylinder contains a piston 66 for reciprocating a vertical piston rod 67. The piston rod acts against a hinged roller frame 68 carrying a pair of rollers 69. The roller frame is hinged as shown at 71 and the upward and downward movement thereof is limited by means of stop nuts 70. The upper stop nuts are accurately set to stop the upward movement of the roller frame when the axis of the particular pipe being worked on and the axis of the expanding mandrel have been brought into accurate horizontal alignment between the bearings 12 and the centering shaft 55.

The fluid for operating the jack is obtained from the pressure tank 42 through a pressure pipe 72 and is returned to the sump tank 44 through a return pipe 73. The flow to the opposite ends of the cylinder 65 is controlled by means of a four-way jack valve 74 operable by the foot of the welder. The switch controls for controlling the motor 29 are also placed in a position convenient to the welder in order that he may conveniently control all operations of the machine.

In use, the first length of pipe is slid along the guide rollers 50 until it slides up over the cone 57 and centers itself against the cross arm 50. The second pipe length is then slid along the guide rollers until it abuts the end of the first length around the expanding mandrel. The truck 53 is now brought up until the second centering cone 55 is driven into the free extremity of the second length and is locked therein by means of the clamp screws 61. The truck may if desired be now locked to the rails by means of the rail clamps 75.

The jack valve 74 is now operated to lift the pipe from the guide rollers and bring it, and the mandrel, into horizontal axial alignment and the valve plug 40 is operated to cause the plunger shaft 15 to expand the mandrel within the contracting pipe extremities.

The motor 29 is now started and any suitable welding device, such as an electric arc welder, is brought into play over the abutting edges of the joint which slowly revolve beneath the welder until the entire circumference has been welded. The copper blocks 64 beneath welder rapidly conduct the heat away to chill the molten metal on the interior and maintain on a smooth even internal surface.

When the weld is complete the mandrel is collapsed, the jack lowered and the joined lengths are pulled from the machine by withdrawing the truck 53. The third length is now placed on the machine and the two joined lengths brought forward into abutting contact therewith and the second joint is completed similarly to the first after which the three joined lengths are withdrawn and the fourth inserted until the desired total length has been attained.

In Figs. 14 and 15 a construction of the expanding mandrel is illustrated which is more particularly designed to fit within very small diameter pipe lengths. This form operates similarly to the previously described form from the reciprocation of the plunger shaft 15. This form of mandrel employs an inner sleeve 77 which threads into the extremity of the tubular shaft 13 and an outer sleeve 78 which is clamped on the end of the plunger shaft 15 by means of the clamp nut 17. Both sleeves have internal bushings 79 which hold them in alignment on the plunger shaft.

Each sleeve carries a series of spaced apart, hinged arms 80 mounted on hinge pins 81 between hinge ears 82 in the sleeves. The arms are hinged at the outer extremities of the sleeves and the free extremities of the arms on one sleeve extend between and alternate with the extremities of the arms on the other sleeve to form the complete mandrel surface. The arms are longer than their respective sleeves and extend beyond the adjacent extremities of the latter. The inner surfaces of the "extending-beyond" extremities of the arms are projected inward to the plunger shaft, as shown at 83, and thence curve outwardly to form curved wedge surfaces 84.

Each series of arms is constantly urged inward or closed by means of annular spiral tension springs 85 which pass through suitable openings in the arms and completely surround the sleeves 77 and 78. When the plunger shaft 15 is projected, as shown in Fig. 14, the springs pull the arms inward until the hooked ends 83 thereof rest against the plunger shaft 15. When the plunger shaft is retracted the wedge surfaces 84 of each set of arms ride outward on the extremity of the adjacent sleeve to wedge the arms outwardly toward the expanded position of Fig. 15. The surrounding pipe would prevent the arms from ever reaching the fully expanded position of Fig. 15.

In all forms of the mandrel the overlapping extremities of the arms are tapered to form spade-like shoes which wedge between each other when the arms are fully expanded to form a smooth continuous external welding surface defined by a circular copper band formed by copper blocks 86 inset in their outer surfaces of the shoes.

It has been found that after the welding has been completed the pipe would occasionally clamp the outer diameter of the inner cone so tightly that it was difficult to remove. This was avoided by placing hardened ratchet-like toothed blocks 87 in the mandrel arms carried by the plunger shaft. When the latter shaft is drawn inward to expand the mandrel, these teeth will be forced into the metal. When the plunger shaft is projected these arms move outwardly causing the teeth to first draw the pipe from the centering cone 57 thence to move inward out of contact with the pipe.

For electrical welding purposes the pipe being welded forms one pole of the electric arc circuit. This heavy welding current is transmitted from the pipe to the expanding mandrel and thence to the shafts 13 and 15. If this current is allowed to flow through the ball bearings 12 to the base frame of the machine it results in damage to the bearing balls. This is avoided in this machine by placing a plurality of copper collecting rings 88 around the shaft 13 against which a plurality of current collecting brushes 89 bear to carry off the welding current. The copper blocks 64 beneath the arc quickly conduct away the heat and chill the weld on a smooth even plane with the pipe interior.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A device for supporting pipe sections in axial alignment with each other for butt welding the contacting ends thereof comprising: a supporting structure; horizontally aligned bearings in said structure; a tubular shaft supported in said bearings and projecting forwardly therefrom a sufficient distance to extend throughout the length of a pipe section; means for rotating said tubular shaft; a reciprocating shaft extending throughout the length of said tubular shaft and projecting beyond the extremities thereof; means for reciprocating said tubular shaft; and an expanding head on the outer extremity of both shafts to be expanded and contracted in consequence of the reciprocation of said reciprocating shaft.

2. A device for supporting pipe sections in axial alignment with each other for butt welding the contacting ends thereof comprising: a supporting structure; horizontally aligned bearings in said structure; a tubular shaft supported in said bearings and projecting forwardly therefrom a sufficient distance to extend throughout the length of a pipe section; means for rotating said tubular shaft; a reciprocating shaft extending throughout the length of said tubular shaft and projecting beyond the extremities thereof; means for reciprocating said tubular shaft; a first series of expanding members carried on the projecting extremity of said tubular shaft; a second series of expanding members carried on the projecting extremity of said reciprocating shaft, the members of said second series alternating with the members of the first series to form an annular mandrel surface; and means surrounded by said surface against which the expanding members contact as said reciprocating shaft is drawn inward to expand both series of members.

3. A device for supporting pipe sections in axial alignment with each other for butt welding the contacting ends thereof comprising: a supporting structure; horizontally aligned bearings in said structure; a tubular shaft supported in said bearings and projecting forwardly therefrom a sufficient distance to extend throughout the length of a pipe section; means for rotating said tubular shaft; a reciprocating shaft extending throughout the length of said tubular shaft and projecting beyond the extremities thereof; means for reciprocating said tubular shaft; a first series of expanding members carried on the projecting extremity of said tubular shaft; a second series of expanding members carried on the projecting extremity of said reciprocating shaft, the members of said second series alternating with the members of the first series to form an annular mandrel surface; a first series of rollers carried by said tubular shaft beneath the second series of expanding members; a second series of rollers carried by the reciprocating shaft beneath the first series of expanding members, all of said members having rounded surfaces where they contact said rollers so that when they are drawn thereover by the movement of the reciprocating shaft they will be simultaneously forced outwardly.

4. A device for supporting pipe sections in axial alignment with each other for butt welding the contacting ends thereof comprising: a supporting structure; horizontally aligned bearings in said structure; a tubular shaft supported in said bearings and projecting forwardly therefrom a sufficient distance to extend throughout the length of a pipe section; means for rotating said tubular shaft; an expanding head on the forward extremity of said tubular shaft; a reciprocating shaft extending axially through said tubular shaft for actuating said expanding head; a pressure cylinder supported on the rearward extremity of said tubular shaft; a piston secured on the rearward extremity of said reciprocating shaft and slidably mounted in said cylinder; and means for admitting fluid under pressure to alternate ends of said cylinder to reciprocate said piston therein.

5. A device for supporting pipe sections in axial alignment with each other for butt welding the contacting ends thereof comprising: a supporting structure; horizontally aligned bearings in said structure; a tubular shaft supported in said bearings and projecting forwardly therefrom a sufficient distance to extend throughout the length of a pipe section; means for rotating said tubular shaft; an expanding head on the forward extremity of said tubular shaft; a reciprocating shaft extending axially through said tubular shaft for actuating said expanding head; a pressure cylinder supported on the rearward extremity of said tubular shaft; a piston secured on the rearward extremity of said reciprocating shaft and slidably mounted in said cylinder; a cylindrical trunnion projecting axially from said cylinder provided with two longitudinal passages; a pair of stationary annular fluid conduits surrounding said trunnion, each communicating with one of said passages; cylinder conduits communicating between said passages and opposite extremities of said cylinder for admitting fluid under pressure to alternate ends of said cylinder from said annular conduits to reciprocate said piston therein.

6. An expanding mandrel for supporting the adjacent ends of axially aligned pipe sections in register comprising: a tubular supporting shaft; a central shaft carried within said tubular shaft and projecting beyond the forward extremity thereof; a first mandrel member secured on the extremity of said tubular shaft; a second mandrel member secured on the extremity of said central shaft; a radial series of mandrel shoes hinged to each mandrel member, the shoes of each series being spaced apart to receive the shoes of the other series therebetween, the two series being directed toward each other to form a complete drum-like head; a wedge-shaped inner surface on the extremity of each shoe, the wedge-shaped inner surfaces of the shoes contacting the opposite mandrel member, so that when said two mandrel members are drawn toward each other all of said shoes will be simultaneously expanded; and means for drawing said inner shaft into said tubular shaft to cause said mandrel members to approach each other.

7. An expanding mandrel for supporting the adjacent ends of axially aligned pipe sections in register comprising: a tubular supporting shaft; a central shaft carried within said tubular shaft and projecting beyond the forward extremity thereof; a first mandrel member secured on the extremity of said tubular shaft; a second mandrel member secured on the extremity of said central shaft; a radial series of mandrel shoes hinged to each mandrel member, the shoes of each series being spaced apart to receive the shoes of the other series therebetween, the two series being directed toward each other to form a complete drum-like head; a wedge-shaped inner surface on the extremity of each shoe; the wedge-shaped inner surfaces of the shoes of each series contacting the opposite mandrel member, so that when said two mandrel members are drawn toward each other all of said shoes will be simultaneously expanded; means for drawing said inner shaft into said tubular shaft to cause said mandrel members to approach each other; and spring means for urging said shoes radially inward.

8. A mandrel for use in welding a circumferential seam between two pipe sections, comprising: a tubular shaft for insertion in said sections; a reciprocating shaft within said tubular shaft; a first series of expanding members hingedly mounted on said tubular shaft; a second series of expanding members hingedly mounted on said reciprocating shaft, the members of the second series alternating with the members of the first series to form an annular sectional mandrel surface; and means surrounded by said surface for urging all of said members outwardly as said reciprocating shaft is drawn into said tubular shaft.

9. A mandrel for use in welding a circumferential seam between two pipe sections, comprising: a tubular shaft for insertion in said sections; a reciprocating shaft within said tubular shaft and projecting beyond the extremity thereof; an outer mandrel sleeve fixed to the projecting extremity of said reciprocating shaft; an inner mandrel sleeve secured to said tubular shaft; a first series of expanding arms hinged on, and extending forwardly from, said inner sleeve; a second series of expanding arms hinged on, and extending rearwardly from, said outer sleeve between, and alternating with, the arms of the first series; and wedge surfaces on the shaft side of all of said arms for contacting said sleeves as said reciprocating shaft is drawn into said tubular shaft to expand all arms simultaneously.

10. A mandrel for use in welding a circumferential seam between two pipe sections, comprising: a tubular shaft for insertion in said sections; a reciprocating shaft within said tubular shaft; a first series of expanding members hingedly mounted on said tubular shaft; a second series of expanding members hingedly mounted on said reciprocating shaft, the members of the second series alternating with the members of the first series to form an annular sectional mandrel surface; means surrounded by said surface for urging all of said members outwardly as said reciprocating shaft is drawn into said tubular shaft; and spring means for urging all of said members toward the axis of said shafts.

11. A device for supporting two sheet metal pipe sections in axial alignment with each other for welding a circumferential seam therebetween comprising: a supporting structure; a shaft supported by, and projecting horizontally from said structure a sufficient distance to extend through the first pipe section; a circular expanding head on the outer extremity of said shaft for aligning the adjacent extremities of both sections; a conical centering member on the extremity of said shaft adjacent said structure for entering and centering the free extremity of the first section; a second conical centering member entering and centering the free extremity of the second section; and a carriage in parallel alignment with the axes of said sections to maintain said second centering member in axial alignment at all positions thereof.

12. A device for supporting two sheet metal pipe sections in axial alignment with each other for welding a circumferential seam therebetween comprising: a supporting structure; a shaft supported by, and projecting horizontally from said structure a sufficient distance to extend through the first pipe section; a circular expanding head on the outer extremity of said shaft for aligning the adjacent extremities of both sections; a conical centering member on the extremity of said shaft adjacent said structure for entering and centering the free extremity of the first section; a second conical centering member entering and centering the free extremity of the second section; a carriage in parallel alignment with the axes of said sections to maintain said second centering member in axial alignment at all positions thereof; and means for securing both pipe sections over their respective centering members.

13. A mandrel for use in welding a circumferential seam between two pipe sections comprising: a first horizontal shaft; a second horizontal shaft adjacent the first shaft, said shafts being supported at one extremity so that they may be inserted into a pipe section at their other extremity; means for revolving both shafts about the axis of the pipe section; means for reciprocating one of said shafts longitudinally; a first series of expanding members hingedly mounted on the free extremity of the first shaft; a second series of hinged expanding members, the latter members alternating with the members of the first series to form an annular sectional mandrel surface; and means surrounded by said members for urging all of said members outwardly as a consequence of the reciprocation of the reciprocating shaft.

GAIRALD H. GARRETT.
HORACE JACKSON.